(12) United States Patent
Donauer

(10) Patent No.: US 10,512,867 B2
(45) Date of Patent: Dec. 24, 2019

(54) FILTER ASSEMBLY

(71) Applicant: MANN+HUMMEL GMBH, Ludwigsburg (DE)

(72) Inventor: Nadine Donauer, Fellbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 186 days.

(21) Appl. No.: 15/485,768

(22) Filed: Apr. 12, 2017

(65) Prior Publication Data

US 2017/0291129 A1 Oct. 12, 2017

(30) Foreign Application Priority Data

Apr. 12, 2016 (DE) .......................... 10 2016 004 315

(51) Int. Cl.
*B01D 46/24* (2006.01)
*B01D 46/00* (2006.01)
(Continued)

(52) U.S. Cl.
CPC ..... *B01D 46/0005* (2013.01); *B01D 46/0021* (2013.01); *B01D 46/0023* (2013.01); *B01D 46/0024* (2013.01); *B01D 46/24* (2013.01); *B01D 46/2411* (2013.01); *B01D 46/521* (2013.01); *B01D 2271/022* (2013.01); *B01D 2271/027* (2013.01); *B01D 2275/201* (2013.01); *B01D 2275/202* (2013.01);
(Continued)

(58) Field of Classification Search
CPC ........ B01D 46/24; B01D 46/52; B01D 46/00; B01D 46/2414; B01D 46/0005; B01D 46/521; B01D 46/241; B01D 46/0023; B01D 46/0024; B01D 2271/027; B01D 2271/022; B01D 2275/201
USPC ......... 55/482, 498, 502, 507, 509, 510, 521, 55/385.3; 123/198 E
See application file for complete search history.

(56) References Cited

U.S. PATENT DOCUMENTS

| | | | |
|---|---|---|---|
| 6,383,244 B1 * | 5/2002 | Wake ................... | B01D 29/114 55/482 |
| 2008/0190082 A1 * | 8/2008 | Scott .................. | B01D 46/0005 55/520 |

(Continued)

FOREIGN PATENT DOCUMENTS

| | | |
|---|---|---|
| DE | 2819198 A1 | 11/1978 |
| WO | 2007009040 A1 | 1/2007 |

(Continued)

*Primary Examiner* — Minh Chau T Pham
(74) *Attorney, Agent, or Firm* — James Hasselbeck

(57) ABSTRACT

A filter assembly has a main filter element disposed in a filter housing and provided with an end disk with a first sealing element that seals the main filter element relative to the filter housing. A secondary filter element is disposed in the filter housing and is provided with an end disk with a second sealing element that seals the secondary filter element relative to the filter housing. The end disk of the secondary filter element is arranged relative to an axial direction of the filter assembly between the end disk of the main filter element and the filter housing. The end disk of the secondary filter element is arranged inside a flow cross section of a fluid outlet of the filter housing. The end disks of the main filter element and of the secondary filter element are axially supported on each other at least over sections thereof.

14 Claims, 7 Drawing Sheets

(51) Int. Cl.
   *B01D 46/52*     (2006.01)
   *F02M 35/02*     (2006.01)
   *F02M 35/024*    (2006.01)

(52) U.S. Cl.
   CPC .... *B01D 2275/208* (2013.01); *B01D 2279/60* (2013.01); *F02M 35/0205* (2013.01); *F02M 35/02425* (2013.01)

(56) References Cited

U.S. PATENT DOCUMENTS

| | | | |
|---|---|---|---|
| 2009/0049814 A1* | 2/2009 | Baseotto | B01D 46/009 55/482 |
| 2013/0111858 A1 | 5/2013 | Coulonvaux | |
| 2013/0263744 A1* | 10/2013 | Osendorf | B01D 46/0005 96/380 |
| 2016/0114275 A1* | 4/2016 | Schwartz | B01D 46/0024 55/488 |
| 2016/0129385 A1 | 5/2016 | Schulz | |
| 2016/0144310 A1* | 5/2016 | Movia | B01D 46/2414 55/478 |
| 2019/0063380 A1* | 2/2019 | Dirnberger | B01D 46/10 |

FOREIGN PATENT DOCUMENTS

| | | |
|---|---|---|
| WO | 2009106590 A1 | 9/2009 |
| WO | 2009106593 A1 | 9/2009 |

* cited by examiner

FILTER ASSEMBLY

BACKGROUND OF THE INVENTION

The present invention concerns a filter assembly.

A filter assembly, for example, for filtering air or liquid operating media of a vehicle, can comprise a main filter element and a secondary filter element received in the main filter element. The secondary filter element serves mainly to prevent, when exchanging the main filter element, a contamination of a clean side of the filter assembly with raw fluid to be filtered.

DE 10 2013 002 057 B4 describes a filter device comprising an outer filter element and an inner filter element, wherein the outer and the inner filter elements are embodied separately and are mounted within each other and the inner filter element has a changing cross sectional shape across its length, wherein the outer filter element comprises a support frame that is a carrier of a filter medium of the filter element, wherein an end face of the inner filter element is supported on the support frame of the outer filter element, and wherein the inner filter element has a linear end face.

EP 2 862 614 A1 describes a filter system with a filter housing, a main filter element, and a secondary filter element, wherein the main filter element and the secondary filter element are received in the filter housing. The main filter element and the secondary filter element each comprise a sealing element for sealing them relative to the filter housing. The sealing element of the secondary filter element is arranged within the sealing element of the main filter element, wherein both sealing elements are supported in the filter housing.

SUMMARY OF THE INVENTION

It is therefore object of the present invention to provide an improved filter assembly.

Accordingly, a filter assembly, in particular an air filter assembly, is proposed comprising a filter housing, a main filter element, comprising an end disk with a first sealing element for sealing the main filter element relative to the filter housing, and a secondary filter element, comprising an end disk with a second sealing element for sealing the secondary filter element relative to the filter housing. The main filter element and the secondary filter element are received in the filter housing, wherein the end disk of the secondary filter element relative to a longitudinal direction of the filter assembly is arranged between the end disk of the main filter element and the filter housing and wherein the end disk of the secondary filter element is arranged inside a flow cross section of a fluid outlet of the filter housing.

The filter assembly is in particular configured to filter fluids, for example, air or other gases, liquids, in particular liquid operating media of a vehicle, in particular of a motor vehicle, such as oil, water, gasoline, diesel, kerosene or urea solutions. In particular, the main filter element is an air filter element. Also, the secondary filter element can be an air filter element. The filter assembly is in particular suitable to filter combustion air of an internal combustion engine, in particular for an agricultural machine, a truck, or a construction machine. In this respect, the filter assembly can be an air filter assembly for combustion air of an internal combustion engine of a motor vehicle. The filter assembly can find use in motor vehicles, watercraft, rail vehicles, agricultural vehicles, construction machines, aircraft, or the like. Moreover, the filter assembly can also be used in immobile applications, for example, in building technology.

The main filter element can also be referred to as first filter element, primary filter element, primary element, or main element. The secondary filter element can also be referred to as second filter element, safety filter element, safety element, secondary element, auxiliary filter element or auxiliary element. The secondary filter element is optional. This means that the filter assembly can function even without the secondary filter element. The secondary filter element is in particular suited to prevent upon exchange of the main filter element that fluid to be filtered can flow from a raw side to a clean side of the filter assembly.

The main filter element comprises preferably an oval cross section. The secondary filter element can also have an oval cross section. As oval cross section, in particular transverse to the longitudinal direction of the filter element, a cross section is understood that has a circumferential line deviating from a circle and, in particular, is of a convex rounded shape. The circumferential line has in this context preferably a curvature without sign change. Conceivable is, for example, an elliptical shape or a stadium shape. In the present case, "oval" can also be understood as a rectangular cross section with rounded corners, an elliptical cross section or a cross section which is formed of several circular arcs. The cross section is preferably closed and comprises a main symmetry axis and a secondary symmetry axis positioned perpendicular to the main symmetry axis. The cross section is symmetrically designed. This means that the cross section is symmetrical relative to the main symmetry axis as well as to the secondary symmetry axis. A length extension of the cross section in the direction of the main symmetry axis is preferably greater than a length extension of the cross section in the direction of the secondary symmetry axis. Alternatively, the main filter element and/or the secondary filter element can also have a circular cross section, respectively.

Preferably, the first sealing element and the second sealing element also have an oval geometry or contour. The main filter element comprises preferably a first end disk on which the first sealing element is provided and a second end disk. Between the two end disks, a folded filter medium can be arranged. The secondary filter element comprises preferably only a single end disk on which the second sealing element is provided. Alternatively, the secondary filter element can also have a first end disk and a second end disk. The secondary filter element can be a folded filter medium or a flat filter medium. The secondary filter element can be plate-shaped or bag-shaped. A bag-shaped filter element is, for example, described in the aforementioned DE 10 2013 002 057 B4. The main filter element and/or the secondary filter element can also have a variable fold height. Such filter elements with variable fold height are, for example, described in DE 10 2012 000 470 A1.

Since the end disk of the secondary filter element is arranged between the end disk of the main filter element and the filter housing, the secondary filter element is anti-vibrationally fixed. In particular, the secondary filter element is axially secured in this way. Due to the axial fixation, the seal-tightness function of the sealing elements is improved. Since the end disk of the secondary filter element is arranged inside the flow cross section of the fluid outlet, a constriction of the flow cross section of the fluid outlet is avoided when the secondary filter element is eliminated. In this way, the filter performance can be improved. Since the end disk of the secondary filter element is supported directly on the end disk of the main filter element, the secondary filter element can be produced more cost efficiently because no metal rail or plastic rail for support thereof on the main filter element is required. Moreover, a copying protection can be achieved because the secondary filter element must be designed such that it can be received only between the end disk of the main filter element and the housing. Tolerances in the manufacture of the main filter element and of the secondary filter element can easily be compensated by means of the sealing devices. A damage of the secondary filter element or noise development upon removal of the main filter element are prevented in that the secondary filter element is arranged within the flow cross section.

In embodiments, the first sealing element seals the main filter element radially relative to the filter housing and the second sealing element seals the secondary filter element radially relative to the filter housing. In this context, "radial" is to be understood as a direction oriented perpendicular to the longitudinal direction of the filter assembly. Preferably, the filter housing has a tubular sealing section on which the first sealing element as well as the second sealing element are resting seal-tightly. The first sealing element is in particular monolithically formed together with the end disk of the main filter element and the second sealing element is monolithically formed together with the end disk of the secondary filter element. The end disks are preferably manufactured from a plastic material. In particular, the end disks can be manufactured from polyurethane material (PUR) that is cast onto the respective filter medium of the main filter element or of the secondary filter element. The end disks are thus elastically deformable and/or compressible. Since the sealing elements seal radially and not axially, the axial fixation of the secondary element can be realized exclusively by the end disk of the main filter element and the filter housing.

In embodiments, a first sealing direction of the first sealing element is oriented opposite to a second sealing direction of the second sealing element. The sealing directions are oriented preferably perpendicular to the longitudinal direction of the filter assembly. The first sealing direction is oriented from the main filter element in the direction toward the secondary filter element. The second sealing direction is oriented from the secondary filter element in the direction toward the main filter element. In particular, the sealing section of the filter housing is arranged between the first sealing element and the second sealing element so that the sealing elements preferably do not directly contact each other.

In embodiments, the end disk of the secondary filter element is elastically deformable and compressed between the end disk of the main filter element and the filter housing in the longitudinal direction. In this way, the end disk of the secondary filter element is clamped between the end disk of the main filter element and the filter housing. In this way, a fixed and permanent seat of the secondary filter element is ensured even in case of strong vibrations.

In embodiments, the filter housing comprises a plurality of support ribs wherein the end disk of the secondary filter element is arranged between the end disk of the main filter element and the support ribs. By use of support ribs instead of a circumferentially extending step on which the end disk of the secondary element is supported, a constriction of the flow cross section of the fluid outlet due to the aforementioned step can be avoided.

In embodiments, the support ribs project radially into the flow cross section of the fluid outlet. The number of support ribs is random. For example, four to ten support ribs are provided. The support ribs are in particular monolithically formed together with the sealing section of the filter housing. The support ribs can have a tooth geometry or triangular geometry. The filter housing and the support ribs are preferably manufactured from a plastic material.

According to the invention, the end disk of the secondary filter element is supported at least over sections thereof in axial direction on the end disk of the main filter element.

In embodiments, the end disk of the main filter element comprises a first circumferentially extending rib and/or the end disk of the secondary filter element comprises a second circumferentially extending rib, wherein the first circumferentially extending rib is supported on the end disk of the secondary filter element, or wherein the second circumferentially extending rib is supported on the end disk of the main filter element, or wherein the first circumferentially extending rib is supported directly on the second circumferentially extending rib. The circumferentially extending ribs each are monolithically formed together with the respective correlated end disks. This means that the circumferentially extending ribs can be resiliently deformable. By means of the circumferentially extending ribs, due to a reduction of the surface area where the end disks are supporting each other, the surface pressure between the end disk of the secondary filter element and the end disk of the main filter element can be increased. In this way, a reliable fixation of the secondary filter element is achieved.

In embodiments, the first circumferentially extending rib and/or the second circumferentially extending rib have breaks. The breaks can be referred to also as cutouts, perforations, or grooves. In particular, the first circumferentially extending rib and/or the second circumferentially extending rib are not fluid-tight because of the breaks. This means that the circumferentially extending ribs fulfill preferably no sealing function but only a support function.

In embodiments, the secondary filter element is arranged outside of an interior of the main filter element. Preferably, the secondary filter element is arranged completely outside of the interior. The interior of the main filter element is surrounded by a support tube thereof. The filter medium can be wound onto the support tube. The secondary filter element can also be arranged at least partially inside the interior. Preferably, the secondary filter element is however plate-shaped and arranged outside of the interior. The secondary filter element can comprise a support frame on which the end disk is fastened.

In embodiments, the second sealing element is arranged inside the first sealing element. In particular, the second sealing element is arranged in radial direction inside the first sealing element. The second sealing element and the first sealing element comprise preferably an oval contour or geometry, wherein the second sealing element comprises circumferentially a constant spacing relative to the first sealing element.

Further possible implementations of the filter assembly comprise also combinations that are not explicitly mentioned of features or configurations described above or in the following with respect to the embodiments. In this context, a person of skill in the art will also add individual aspects as improvements or supplements to the respective basic form of the filter assembly.

Further configurations of the filter assembly are subject matter of the dependent claims as well as of the embodiments of the filter assembly described in the following. In the following, the filter assembly will be explained with the aid of embodiments with reference to the attached Figures in more detail.

BRIEF DESCRIPTION OF THE DRAWINGS

In the Figures, same or functionally the same elements, unless otherwise specified, are provided with the same reference characters.

DESCRIPTION OF PREFERRED EMBODIMENTS

Figure 1:
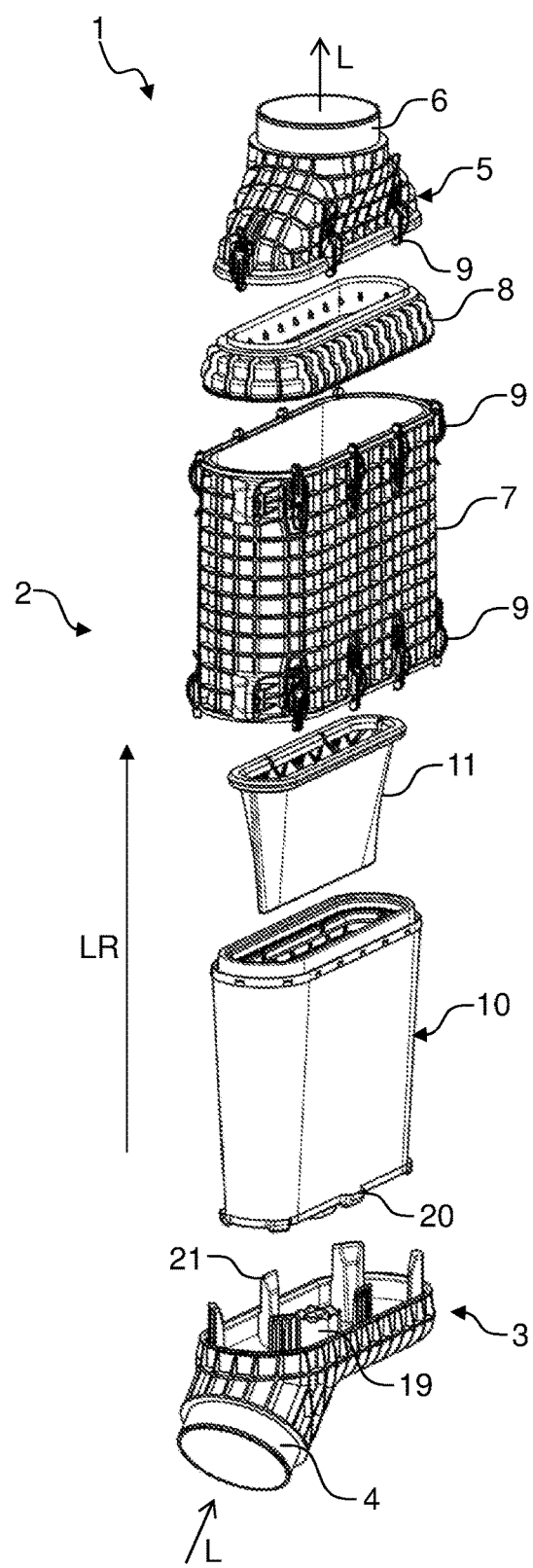
FIG. 1 shows a schematic perspective exploded view of an embodiment of a filter assembly.
Figure 2:
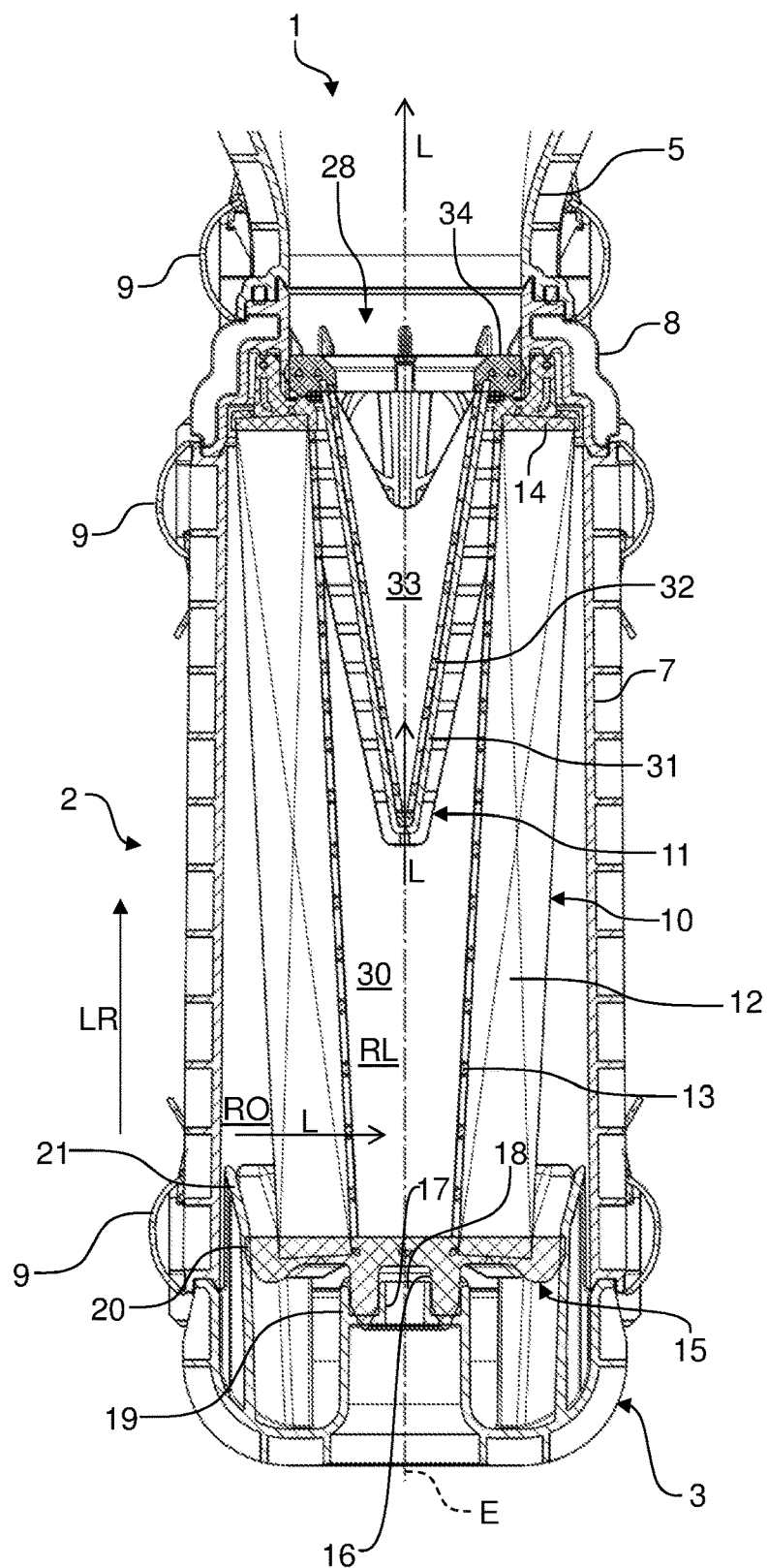
FIG. 2 shows a schematic section view of the filter assembly according to FIG. 1.
Figure 3:
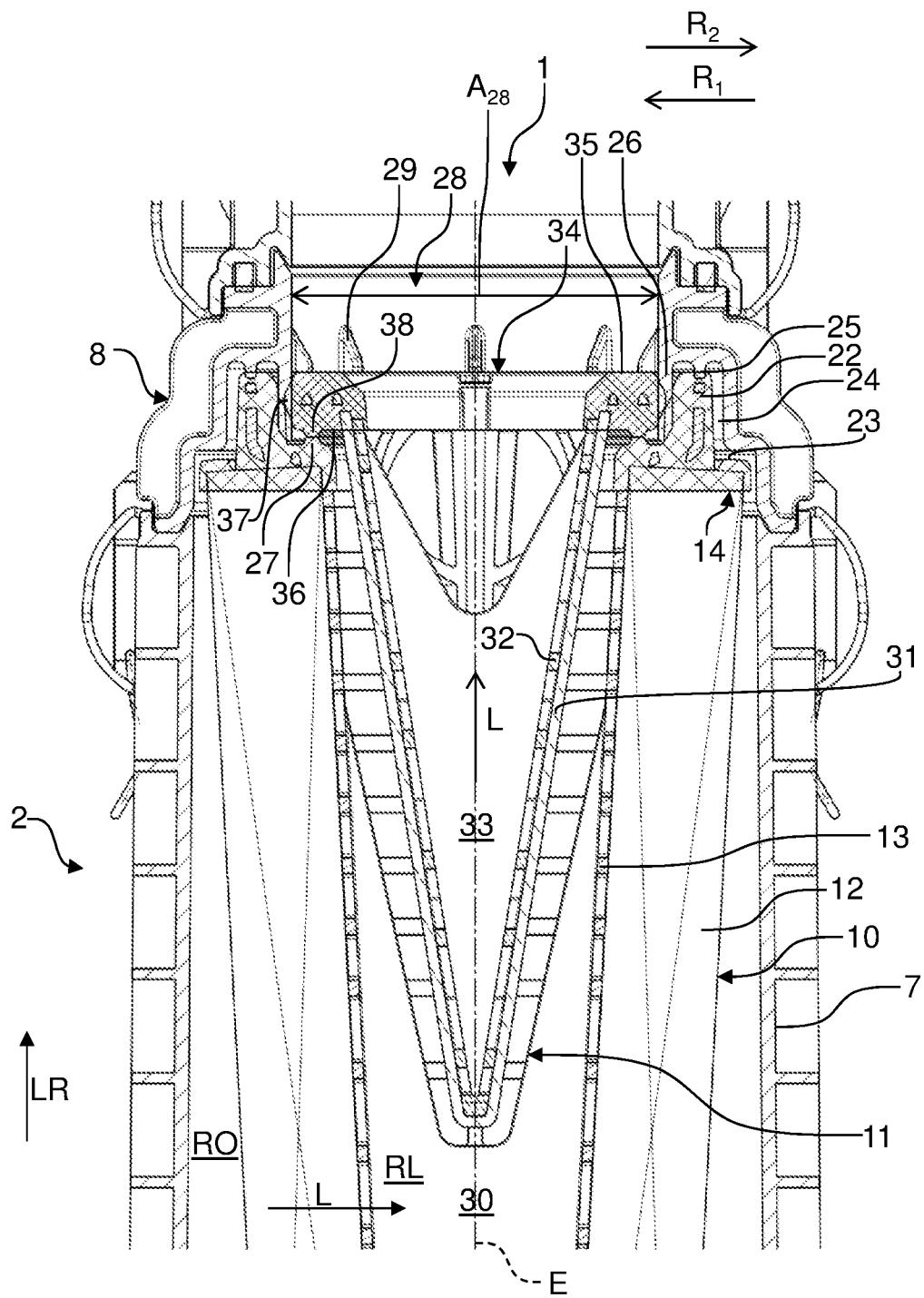
FIG. 3 shows a further schematic section view of the filter assembly according to FIG. 1.
Figure 4:
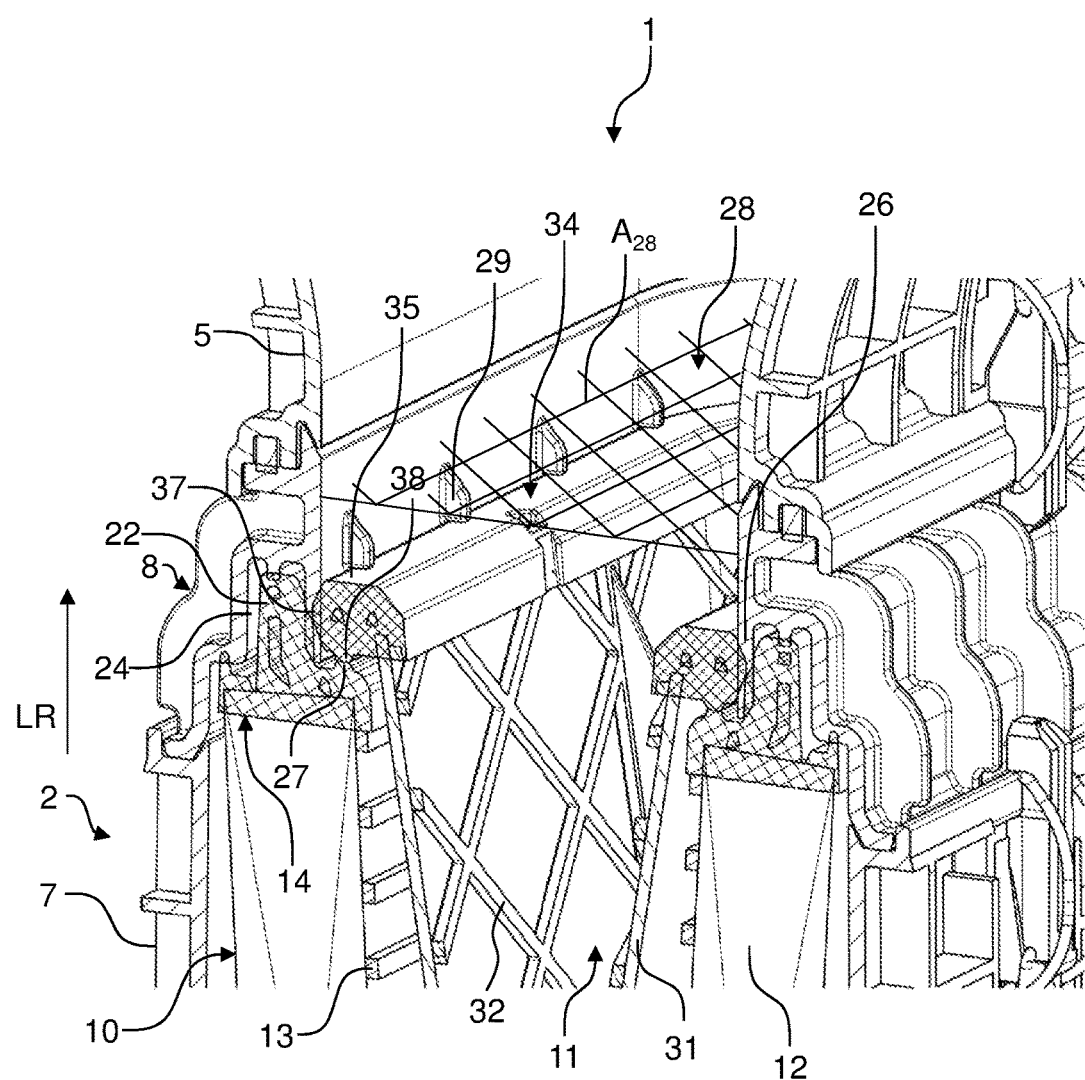
FIG. 4 shows a schematic perspective partial section view of the filter assembly according to FIG. 1.

FIG. 1 shows a schematic perspective exploded view of an embodiment of a filter assembly 1. FIG. 2 shows a schematic section view of the filter assembly 1. FIG. 3 shows a further schematic section view of the filter assembly 1 and FIG. 4 shows a schematic perspective partial section view of the filter assembly 1. In the following, reference is being had simultaneously to FIGS. 1 through 4.

The filter assembly 1 comprises a filter housing 2. The filter housing 2 comprises a first cover 3 with an inflow socket 4, a second cover 5 with an outflow socket 6, a filter receptacle 7 arranged between the first cover 3 and the second cover 5, and an intermediate element 8 that is arranged between the filter receptacle 7 and the second cover 5. The filter receptacle 7 comprises an oval geometry in cross section. The first cover 3, the filter receptacle 7, the intermediate element 8, and the second cover 5 are detachably connected to each other by means of quick release clamps 9 of which a plurality are provided. In particular, on the first cover 4 as well as on the filter receptacle 7, a plurality of quick release clamps 9 are provided, respectively. Filter receptacle 7 and intermediate element 8 can also be embodied together as one piece. Moreover, the second cover 5 and the filter receptacle 7 and/or the intermediate element 8 can be embodied together as one piece.

The filter assembly 1 comprises moreover a main filter element or first filter element 10 and a secondary filter element or second filter element 11 that are both received together in the filter housing 2. The first filter element 10 can also be referred to as primary filter element, primary element or main element. The second filter element 11 can be referred to also as safety filter element, safety element, secondary element, auxiliary element, or auxiliary filter element.

The filter assembly 1 can be used preferably in motor vehicles, trucks, construction vehicles, watercraft, rail vehicles, agricultural machines or vehicles, or aircraft. The second cover 5 is then connected with a fluid line. The filter assembly 1 or the first filter element 10 is in particular suited to filter combustion air of an internal combustion engine. Preferably, the first filter element 10 is an air filter. The second filter element 11 can also be suitable for filtering combustion air of an internal combustion engine. Preferably, the second filter element 11 is also an air filter. The second filter element 11 is optional. This means that the filter assembly 1 can function even without the second filter element 11. The second cover 5 is preferably connected with a supply line for purified combustion air of the internal combustion engine or partially forms it.

The first filter element 10 comprises a filter medium 12 that surrounds a support tube or center tube 13. For example, the filter medium 12 can be wound onto the center tube 13. The center tube 13 is preferably of a grid structure and thus fluid-permeable. In particular, the center tube 13 can be made from plastic material. The filter medium 12 is preferably folded. The filter medium 12 is, for example, a filter fabric, a laid filter material, or a filter nonwoven. In particular, the filter medium 12 can be produced by spun-bonding or melt-blowing methods. Moreover, the filter element 12 can be felted or needled. The filter medium 12 can comprise natural fibers, such as cellulose or cotton, or synthetic fibers, for example, of polyester, polyvinylsulfite or polytetrafluoroethylene. The fibers can be oriented during processing in the machine direction, at a slant thereto and/or transverse thereto.

The first filter element 10 comprises a first end disk 14 and a second end disk 15 between which the filter medium 12 is arranged. The end disks 14, 15 are preferably manufactured from plastic material. The end disks 14, 15 can be made, for example, from PUR, in particular from a foamed PUR. The end disks 14, 15 can be cast onto the filter medium 12 and onto the center tube 13 so that the filter medium 12 and the center tube 13 at least partially extend into the end disks 14, 15. The end disks 14, 15 are at least over sections thereof resiliently deformable and/or compressible. The end disks 14, 15 and also the entire filter elements 10, 11 are formed mirror-symmetrical to a symmetry plane E.

The second end disk 15 comprises in this embodiment a centrally arranged receiving section 16 into which an engagement section 17 of the first cover 3 engages with form fit. The engagement section 17 can be a tubular plug with a central passage 18. The receiving section 16 of the second end disk 15 seals relative to the engagement section 17 in axial direction, i.e., in a longitudinal direction LR of the filter assembly 1, as well as radially, i.e., perpendicular to the longitudinal direction LR so that no fluid can exit from the filter housing 2 through the central passage 18. The engagement section 17 is part of a receiving collar 19 of the first cover 3.

The second end disk 15 comprises moreover a plurality of regularly spaced apart spacers 20 that are designed to be supported on corresponding support sections 21 of the first cover 3. By means of the receiving collar 19, of the spacers 20, and of the support sections 21, the first filter element 10 is positioned in such a way in the filter housing 2 that it cannot move relative to the filter housing 2 even in case of strong vibrations.

It is self-evident that the axial support of the first filter element 10 in the housing 2 is also possible in ways different from the illustrated way.

The first filter element 10 comprises a resiliently deformable first sealing element 22 that is provided on a front face 23 of the first end disk 14 which is facing away from the filter medium 12. The first sealing element 22 is in particular monolithically formed together with the first end disk 14 and extends in an annular shape about the first end disk 14. The first sealing element 22 comprises an oval geometry or contour. The first sealing element 22 is configured to seal the first filter element 10 radially relative to the filter housing 2. For this purpose, the filter housing 2 in the area of the intermediate element 8 has a circumferentially extending receiving section 24 in which the first sealing element 22 is received. In axial direction or in longitudinal direction LR, a stop 25 projects into the receiving section 24 by means of which the first filter element 10 can be positioned axially in the filter housing 2.

The filter housing 2 or the intermediate element 8 comprises moreover a tubular sealing section 26, oval in cross section, against which the first sealing element 22 radially seals in a first sealing direction $R_1$. The first sealing direction $R_1$ is perpendicular to the longitudinal direction LR and is oriented away from the first sealing element 22 in the direction toward the second filter element 11. The first sealing element 22 is resiliently deformed or compressed upon sealing relative to the sealing section 26. This deformation of the first sealing element 22 is indicated in FIGS. 2 through 4 by overlap of the first sealing element 22 and the sealing section 26.

Moreover, a first circumferentially extending rib 27 is provided on the front face 23 of the first end disk 14. The first circumferentially extending rib 27 extends inside the first sealing element 22 and is spaced at a constant spacing circumferentially relative to the first sealing element 22. The first circumferentially extending rib 27 has no sealing action and can be provided with breaks, perforations, or cutouts so that the first circumferentially extending rib 27 is not fluid-tight.

The filter housing 2 or the intermediate element 8 comprises moreover a fluid outlet 28 with a flow cross section $A_{28}$. The flow cross section $A_{28}$ can have an oval geometry. The flow cross section $A_{28}$ is partially visible in perspective in FIG. 4 and is provided with cross hatching for clarification purposes. A plurality of support ribs 29 are projecting radially into the flow cross section $A_{28}$. Beginning at the sealing section 26, the support ribs 29 extend radially into the flow cross section $A_{28}$. The number of support ribs 29 is random. Preferably, the support ribs 29 are arranged to be uniformly spaced from each other.

The first filter element 10 comprises in longitudinal direction LR an oval or elliptical cross section. The cross section can decrease beginning at the first end disk 14 in the direction of the second end disk 15 so that the first filter element 10 tapers conically. Alternatively, the first filter element 10 can be cylindrical and can have an oval or elliptical base surface. In the present case, "oval" can be understood as a rectangular cross section with rounded corners, an elliptical cross section, or a cross section formed of a plurality of circular arcs. The cross section is symmetrically configured.

The second filter element 11 is at least partially received in an interior 30 of the first filter element 10. The interior 30 is delimited in this context by the center tube 13. The second filter element 11 comprises a filter medium 31 which is preferably not folded and is thus flat. The filter medium 31 is, for example, a filter fabric, a laid filter material, or a filter nonwoven. In particular, the filter medium 31 can be produced by a spun-bonding method or melt-blowing method. Moreover, the filter medium 31 can be felted or needled. The filter medium 31 may comprise natural fibers, such as cellulose or cotton, or synthetic fibers, for example, of polyester, polyvinylsulfite, or polytetrafluoroethylene. The fibers can be oriented during processing in the machine direction, at a slant thereto and/or transverse thereto.

The second filter element 11, as can be seen clearly in FIG. 1, is of a bag-shaped configuration. The filter medium 31 is attached to a support tube or center tube 32. The center tube 32 delimits an interior 33 of the second filter element 11. The center tube 32 is grid-shaped and fluid-permeable. For example, the center tube 32 is an injection-molded plastic part. The second filter element 11 comprises only one end disk 34 which is preferably made from plastic material.

The end disk 34 can be made from PUR, in particular from foamed PUR. The end disk 34 is resiliently deformable and compressible.

The end disk 34 can be cast onto the center tube 32 and onto the filter medium 31 so that they are fixedly connected with the end disk 34. The end disk 34 comprises a front face 35 facing the support ribs 29 and a back face 36 facing away from the support ribs 29. The support ribs 29 are contacting the front face 35. The end disk 34 is thus arranged between the support ribs 29 as a support structure of the filter housing 2 and the first end disk 14 of the first filter element 10. In this way, clamping of the end disk 34 between the filter housing 2 and the first end disk 14 of the first filter element 10 can be achieved.

The end disk 34 comprises a circumferentially extending second sealing element 37 for radial sealing of the second filter element 11 relative to the filter housing 2. In particular, the second sealing element 37 is monolithically formed together with the end disk 34. The second sealing element 37 seals in a second sealing direction $R_2$, oriented opposite to the first sealing direction $R_1$, relative to the sealing section 26 of the intermediate element 8 or the filter housing 2. In this context, the second sealing element 37 is compressed. This elastic deformation of the second sealing element 37 is shown in FIGS. 2 to 4 by an overlap of the second sealing element 37 and of the sealing section 26. Like the first sealing element 22, the second sealing element 37 comprises an oval geometry or contour in the viewing direction in the longitudinal direction LR. The second sealing element 37 is arranged inside the first sealing element 22 and preferably is spaced apart therefrom at a constant spacing in the circumferential direction.

On the back face 36 of the end disk 34, a second circumferentially extending rib 38, corresponding to the first circumferentially extending rib 27, is provided. As is shown in FIGS. 2 to 4, the circumferentially extending ribs 27, 38 can be resting against each other so that the end disk 34 of the second filter element 11 is supported on the first end disk 14 of the first filter element 10. The second circumferentially extending rib 38 can also be interrupted. This means it can have breaks, perforations, or cutouts. In particular, the second circumferentially extending rib 38 can be fluid-permeable. First circumferentially extending rib 27 and second circumferentially extending rib 38 are optional, respectively; a direct support of the end disks 14, 34 is also possible. In contrast to the first end disk 14 of the first filter element 10, the end disk 34 of the second filter element 11 is arranged completely inside the flow cross section $A_{28}$.

In operation of the filter assembly 1, the fluid L to be purified, for example, air, flows into the inflow socket 4 of the filter housing 2, is freed from the contaminants by means of the filter elements 10, 11 in the filter housing 2, and flows subsequently out again through the outflow socket 6 of the filter housing 2 as a purified fluid L. In particular, the fluid L to be purified flows from a raw side RO of the first filter element 10 through the filter medium 12 into the interior 30 surrounded by the center tube 13 to a clean side RL of the first filter element 10 as filtered fluid L. The fluid L which has been purified by the first filter element 10 flows then from the interior 30 of the first filter element 10 through the filter element 31 of the second filter element 11 into the interior 33 of the second filter element 11 and from there through the fluid outlet 28 toward the outflow socket 6.

The functionality of the filter assembly 1 is ensured even without the second filter element 11. The second filter element 11 prevents however upon exchange of the first filter element 10 that fluid L to be filtered can reach unfiltered the fluid outlet 28. Since the end disk 34 of the second filter element 11 is completely arranged inside the flow cross section $A_{28}$ of the fluid outlet 28, it is avoided that the flow cross section $A_{28}$ is constricted when the second filter element 11 is eliminated. In this way, an increased filter performance can be achieved. In order to avoid a constriction of the flow cross section $A_{28}$, the end disk 34 of the second filter element 11 is not arranged between a circumferentially extending step of the filter housing 2 constricting the flow cross section $A_{28}$ and the first end disk 14 of the first filter element 10 but between the support ribs 29 that are projecting into the flow cross section $A_{28}$ and the first end disk 14 of the first filter element 10.

Figure 5:
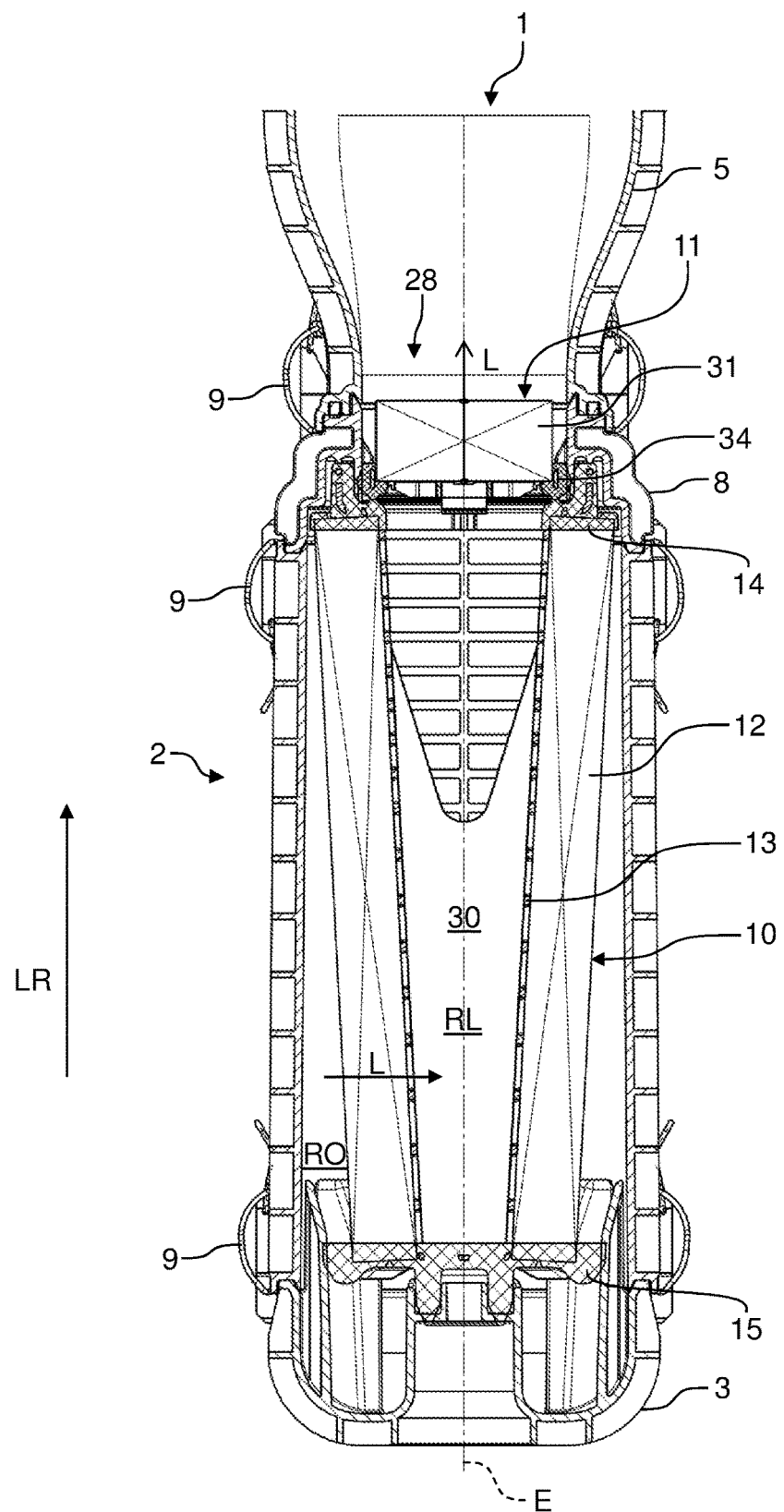
FIG. 5 shows a schematic section view of a further embodiment of a filter assembly.
Figure 6:
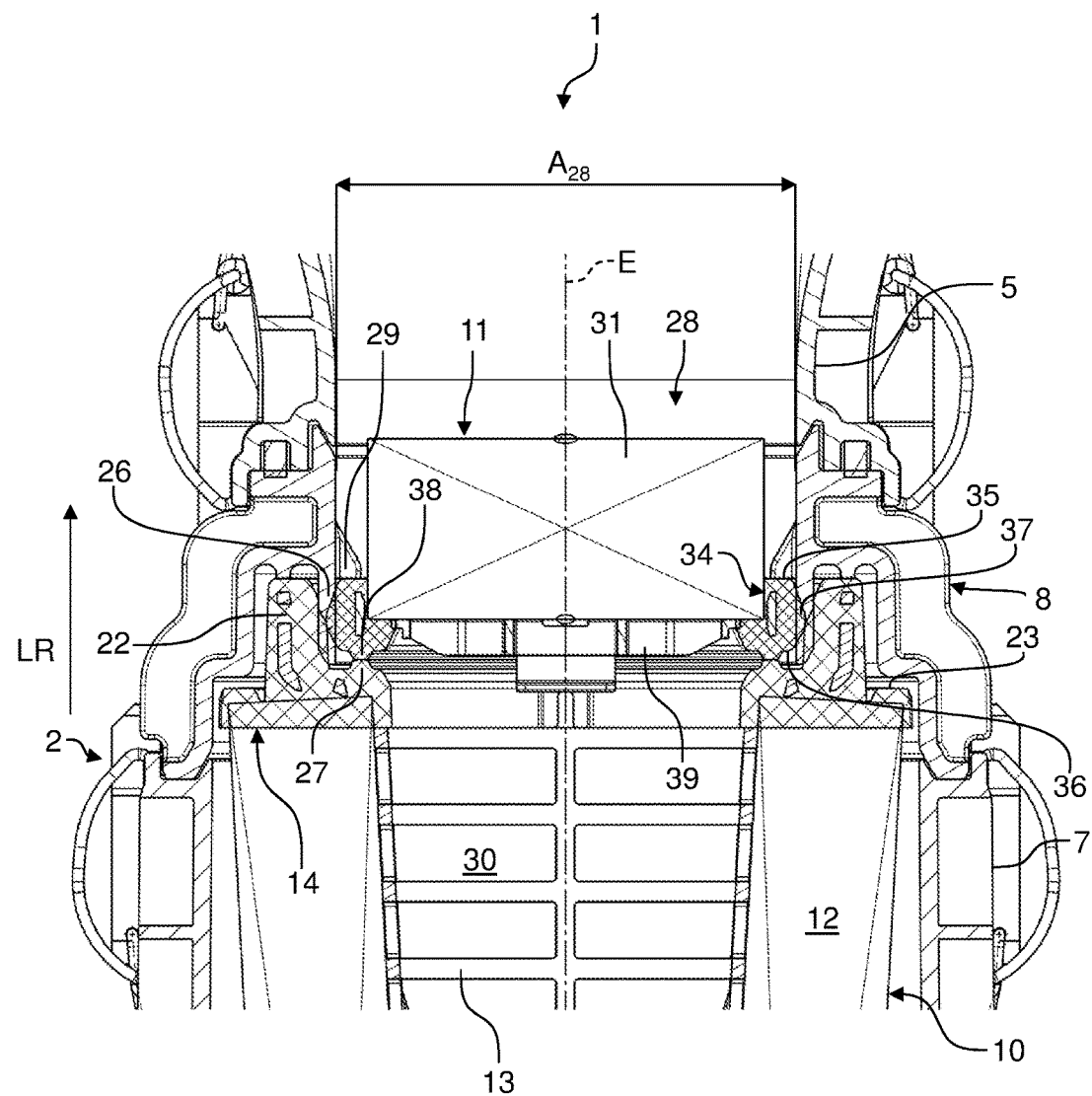
FIG. 6 shows a further schematic section view of the filter assembly according to FIG. 5.

FIGS. 5 and 6 show in schematic section views a further embodiment of a filter assembly 1. The filter assembly 1 according to FIGS. 5 and 6 differs from the filter assembly 1 according to FIGS. 1 through 4 only by a different configuration of the second filter element 11. The second filter element 11 is plate-shaped and comprises a folded filter medium 31 with an end disk 34. The second filter element 11 is arranged completely outside of the interior 30 of the first filter element 10 and in particular arranged in the flow cross section $A_{28}$ of the fluid outlet 28. The end disk 34 can be cast directly onto the filter medium 31.

The second filter element 11 may comprise a support frame 39 which is preferably made from a plastic material. The end disk 34 is cast onto the support frame 39 and onto the filter medium 31. The support frame 39 can also be adhesively connected to the filter medium 31. The functionality of the filter assembly 1 according to FIGS. 5 and 6 corresponds to the functionality of the filter assembly 1 according to FIGS. 1 through 4.

Figure 7:
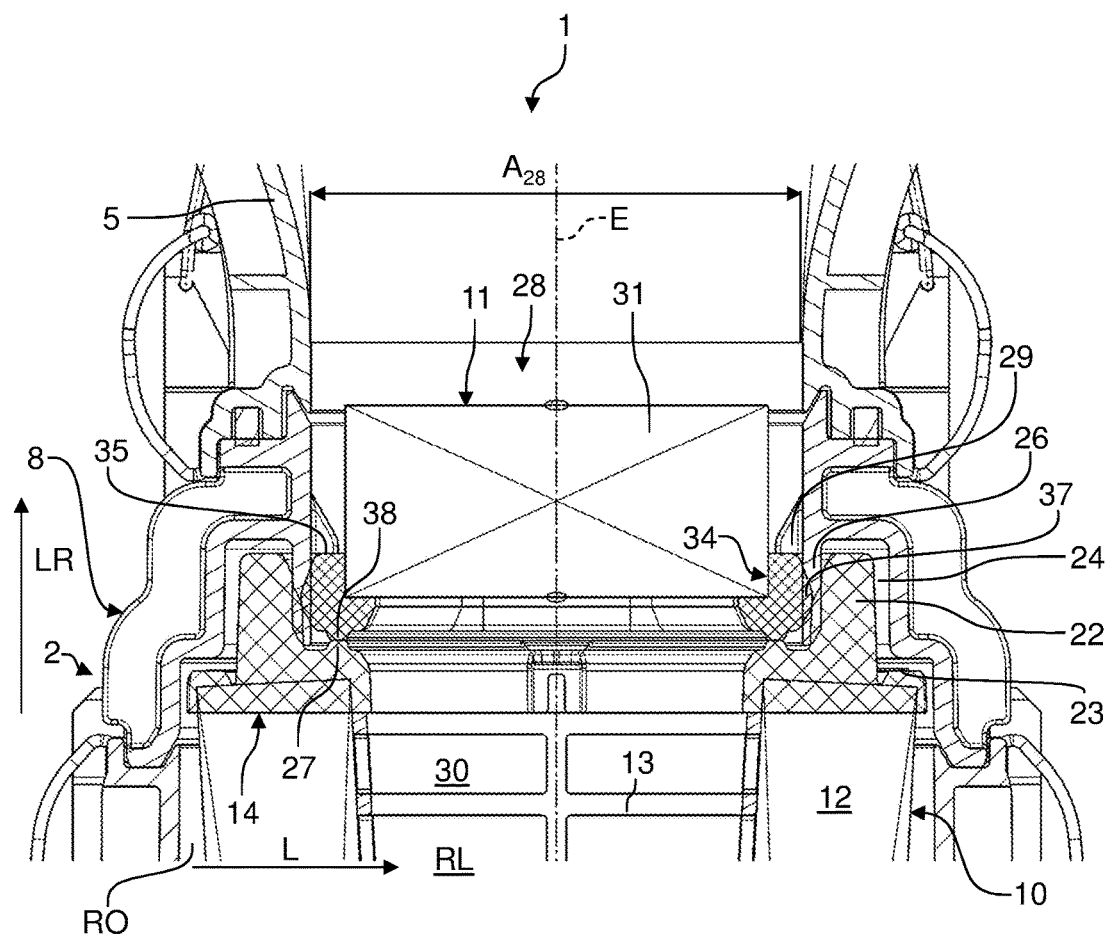
FIG. 7 shows a schematic section view of a further embodiment of a filter assembly.

FIG. 7 shows a schematic section illustration of a further embodiment of the filter assembly 1. The filter assembly 1 according to FIG. 7 differs from the filter assembly 1 according to FIGS. 5 and 6 only in that the second filter element 11 comprises no support frame 39. This means that the end disk 34 is directly cast onto the folded filter medium 31.

While specific embodiments of the invention have been shown and described in detail to illustrate the inventive principles, it will be understood that the invention may be embodied otherwise without departing from such principles.

EMPLOYED REFERENCE CHARACTERS 1 filter assembly
2 filter housing
3 cover
4 inflow socket
5 cover
6 outflow socket
7 filter receptacle
8 intermediate element
9 quick release clamp
10 filter element
11 filter element
12 filter medium
13 center tube
14 end disk
15 end disk
16 receiving section
17 engagement section
18 passage
19 receiving collar
20 spacer
21 support section
22 sealing element
23 front face
24 receiving section
25 stop
26 sealing section
27 rib
28 fluid outlet
29 support rib
30 interior
31 filter medium
32 center tube
33 interior
34 end disk
35 front face
36 back face
37 sealing element
38 rib
39 support frame
$A_{28}$ flow cross section
E symmetry plane
L fluid
LR longitudinal direction
RL clean side
RO raw side
$R_1$ sealing direction
$R_2$ sealing direction

What is claimed is:
1. A filter assembly comprising:
a filter housing comprising:
a fluid outlet;
a support structure comprising:
an annular tubular sealing section arranged in an interior of the filter housing and circumferentially surrounding the fluid outlet, annular tubular sealing section projecting axially inwardly from the filter housing into the interior;
a main filter element disposed in the filter housing and comprising
an end disk with a first sealing element projecting axially outwardly from the end disk in an axial direction away from the main filter element;
wherein the first sealing element seals radially against the annular tubular sealing section of the filter housing;
wherein annular tubular sealing section of the filter housing projects axially inwardly from the filter housing towards the end disk of the main filter element to radially contact against and radially seal against the first sealing element, sealing the main filter element relative to the filter housing;
a secondary filter element disposed in the interior of the filter housing and comprising:
a secondary element end disk with a second sealing element that seals radially against a radially inner surface of the annular tubular sealing section of the filter housing, sealing the secondary filter element relative to the filter housing;
wherein the secondary element end disk is arranged relative to the axial direction of the filter assembly between the end disk of the main filter element and the support structure of the filter housing;
wherein the secondary element end disk is arranged inside a flow cross section of the fluid outlet of the filter housing;
wherein the end disk of the main filter element and the secondary element end disk contact against each other axially and support against each other at least over sections thereof in the axial direction.

2. The filter assembly according to claim 1, wherein the first sealing element seals the main filter element radially relative to the filter housing in a first sealing direction and wherein the second sealing element seals the secondary filter element radially relative to the filter housing in a second sealing direction.

3. The filter assembly according to claim 2, wherein the first sealing direction of the first sealing element is oriented opposite to the second sealing direction of the second sealing element.

4. The filter assembly according to claim 1, wherein the support structure of the filter housing comprises a plurality of support ribs arranged on the radially inner surface of the annular tubular sealing section of the filter housing, the plurality of support ribs projecting radially inwardly from the radially inner surface of the annular tubular sealing section and positioned to contact against an axially outer side of the secondary element end disk; and wherein the secondary element end disk is arranged axially between the end disk of the main filter element and the plurality of support ribs.

5. The filter assembly according to claim 4, wherein the plurality of support ribs project radially into the flow cross section of the fluid outlet of the filter housing.

6. The filter assembly according to claim 1, wherein the end disk of the main filter element comprises a first circumferentially extending rib that projects axially outwardly from the end disk of the main filter element to contact against an be supported on the secondary element end disk.

7. The filter assembly according to claim 6, wherein the first circumferentially extending rib has breaks.

8. The filter assembly according to claim 1, wherein the secondary element end disk comprises a second circumferentially extending rib that projects axially outwardly from the secondary element end disk to contact against and be supported on the end disk of the main filter element.

9. The filter assembly according to claim 8, wherein the second circumferentially extending rib has breaks.

10. The filter assembly according to claim 8, wherein a first circumferentially extending rib contacts directly against the second circumferentially extending rib.

11. The filter assembly according to claim 10, wherein the first circumferentially extending rib or the second circumferentially extending rib has breaks.

12. The filter assembly according to claim 10, wherein the first circumferentially extending rib and the second circumferentially extending rib have breaks.

13. The filter assembly according to claim 1, wherein the secondary filter element is arranged outside of an interior of the main filter element.

14. The filter assembly according to claim 1, wherein the second sealing element is arranged radially inside of the first sealing element.

* * * * *